US010757761B2

(12) United States Patent
Davis

(10) Patent No.: US 10,757,761 B2
(45) Date of Patent: Aug. 25, 2020

(54) APPARATUS AND METHOD FOR SAFELY WARMING FOOD

(71) Applicant: Shannon Davis, Flushing, NY (US)

(72) Inventor: Shannon Davis, Flushing, NY (US)

(73) Assignee: TECHYIDCO LLC, Staten Island, NY (US)

(*) Notice: Subject to any disclaimer, the term of this patent is extended or adjusted under 35 U.S.C. 154(b) by 177 days.

(21) Appl. No.: 15/405,609

(22) Filed: Jan. 13, 2017

(65) Prior Publication Data
US 2017/0208650 A1 Jul. 20, 2017

Related U.S. Application Data

(60) Provisional application No. 62/278,846, filed on Jan. 14, 2016.

(51) Int. Cl.
H05B 3/68 (2006.01)
F24C 15/26 (2006.01)
A47J 36/24 (2006.01)
F24C 15/10 (2006.01)

(52) U.S. Cl.
CPC ............ H05B 3/68 (2013.01); A47J 36/2483 (2013.01); F24C 15/103 (2013.01); F24C 15/26 (2013.01)

(58) Field of Classification Search
CPC .......... H05B 3/68; H05B 3/681; H05B 3/686; H05B 3/70; H05B 3/72; H05B 3/74; H05B 3/746; H05B 3/748; A47J 36/2461; A47J 36/2483; A47J 36/2411; A47J 36/24; F24C 15/10; F24C 15/101; F24C 15/102; F24C 15/103; F24C 15/104; F24C 15/105; F24C 15/107; F24C 15/108; F24C 15/089; F24C 15/26
See application file for complete search history.

(56) References Cited

U.S. PATENT DOCUMENTS 2,276,005 A * 3/1942 Vouvalidis ............... H05B 3/68
219/458.1
2,715,173 A * 8/1955 Farquharson ....... A47J 37/0676
126/211
3,384,737 A * 5/1968 Doutre .................. F24C 15/101
219/449.1

(Continued)

FOREIGN PATENT DOCUMENTS

WO  WO 2016/100409  6/2016

Primary Examiner — Shawntina T Fuqua
(74) Attorney, Agent, or Firm — Pearl Cohen Zedek Latzer Baratz LLP

(57) ABSTRACT

Apparatuses for safely warming food and methods of manufacturing such an apparatus are provided. A heating element may be connected to a base such that there is air between the heating element and the removable top plate, the heating element cannot directly heat a removable top plate of the apparatus, and the heating element must heat the air between the heating element and the removable top plate before heating the removable hot plate. A resetting thermal fuse may be connected to a fuse holder connected to a wall of the base of the apparatus such that the thermal fuse is not directly affected by changes in temperature in the housing of the apparatus, and is affected by changes in temperature of the air between the heating element and the removable top plate.

13 Claims, 13 Drawing Sheets

(56) References Cited

U.S. PATENT DOCUMENTS 4,447,711 A * 5/1984 Fischer .................. H05B 3/70
219/448.11
6,376,810 B2 * 4/2002 Higgins ................ H05B 3/748
219/448.11

* cited by examiner

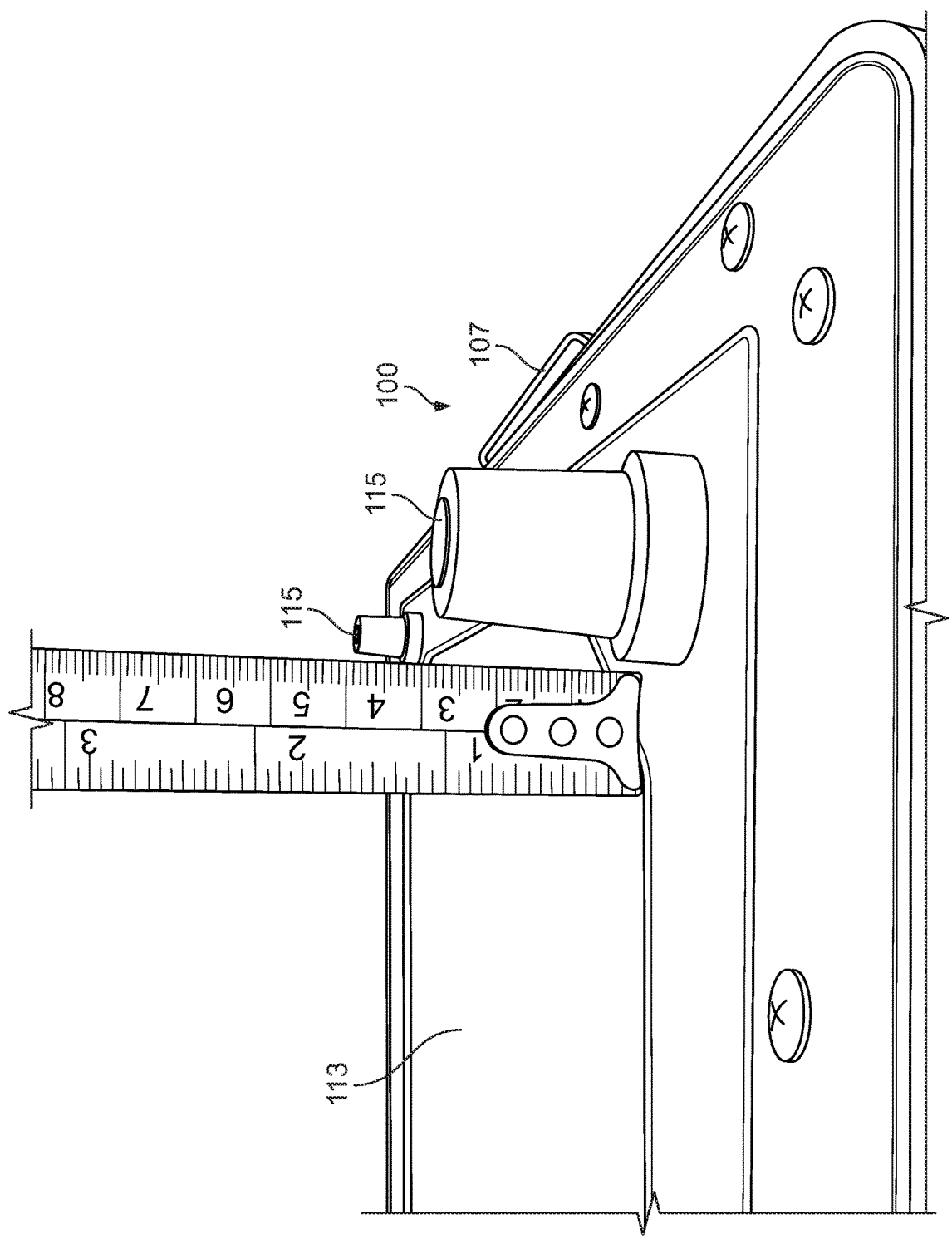

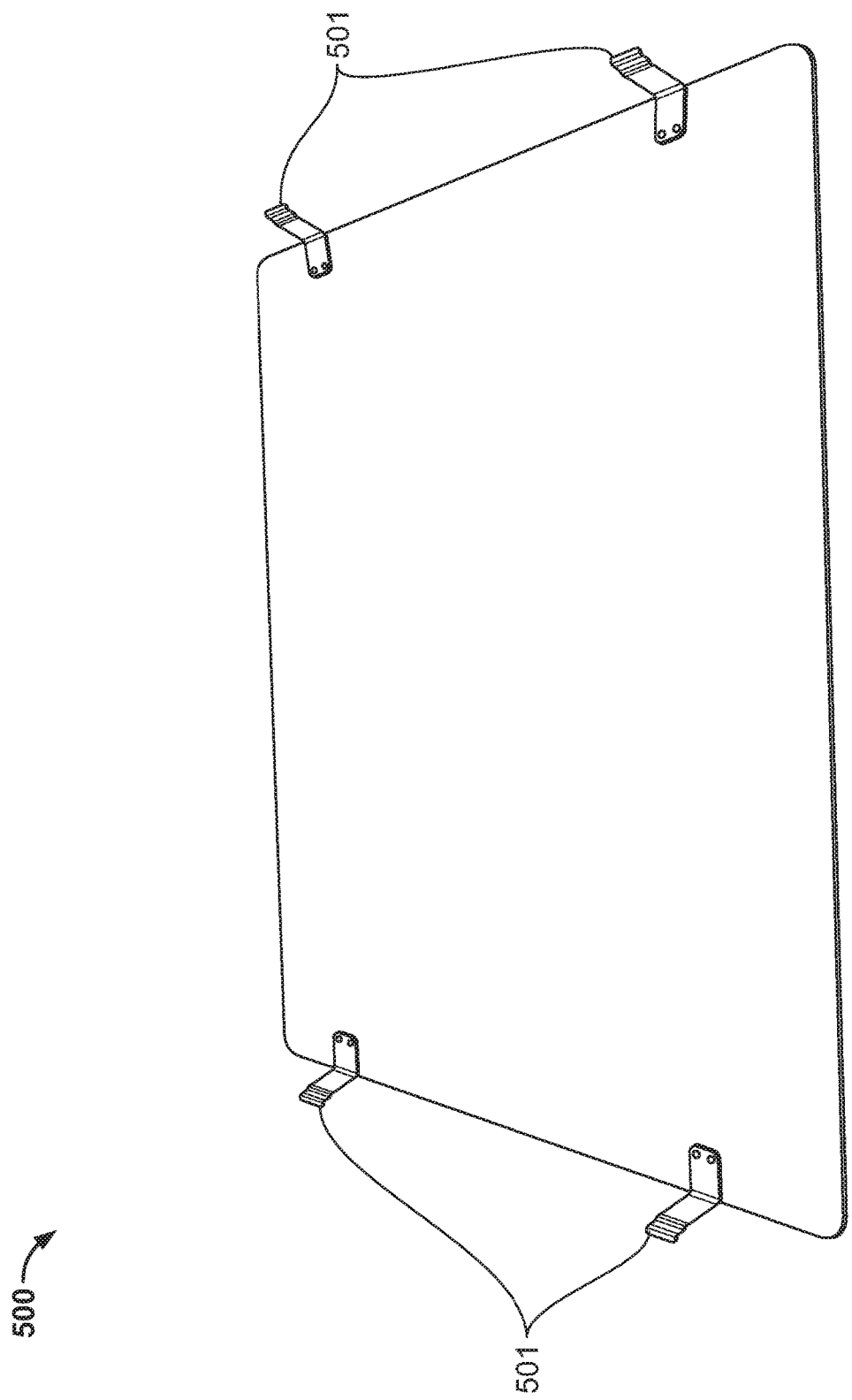

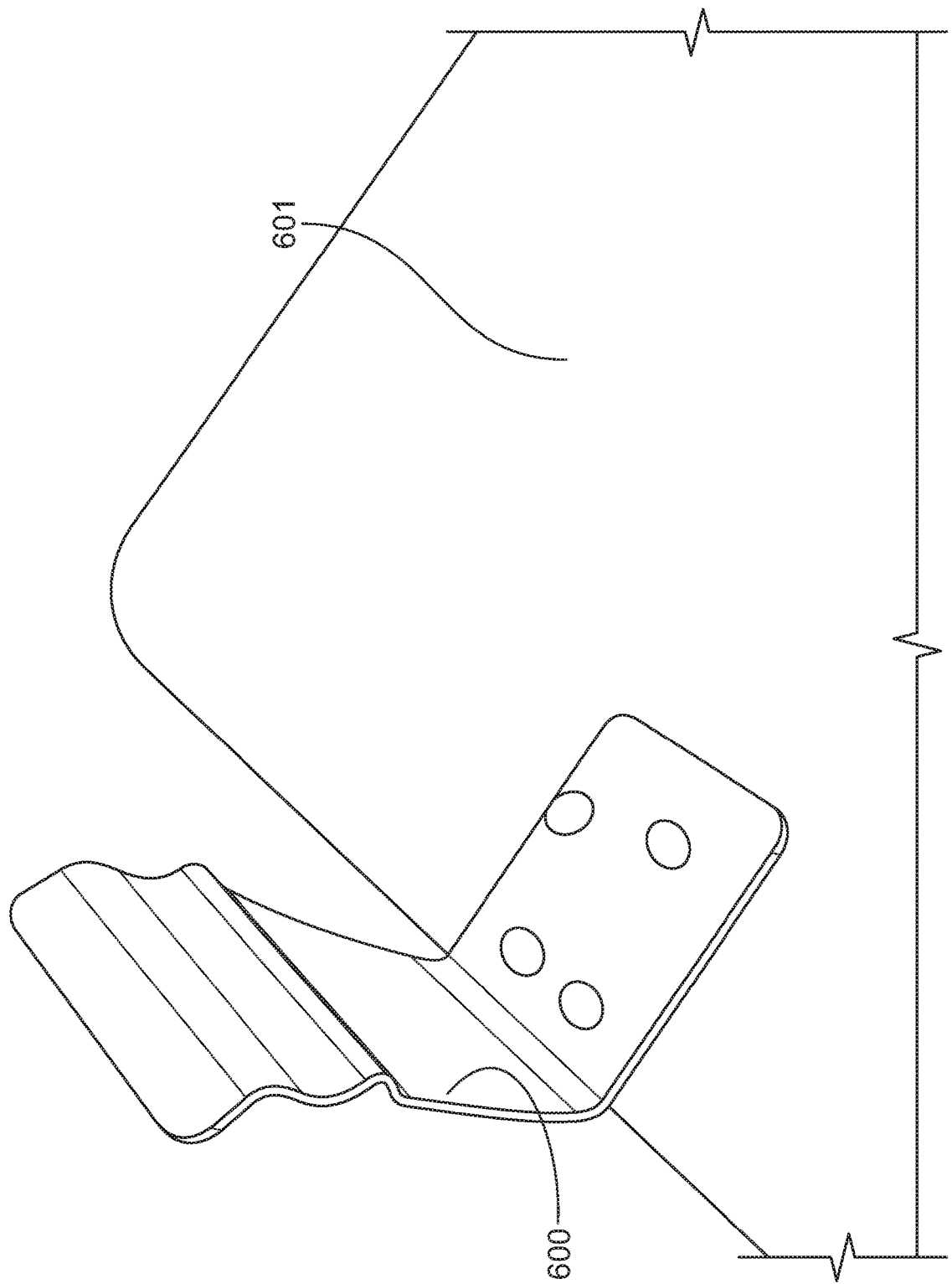

APPARATUS AND METHOD FOR SAFELY WARMING FOOD

CROSS REFERENCE TO RELATED APPLICATION

This application claims the benefit of U.S. Provisional Patent Application No. 62/278,846, filed Jan. 14, 2016, which is incorporated by reference herein in its entirety.

FIELD OF THE INVENTION

The present invention relates to an apparatus and method for safely warming food, and, more particularly, to a fire and shock hazard safety food warming hotplate which can be used for days at a time every week for years of use.

BACKGROUND OF THE INVENTION

Food warming hotplates are commonly used in Jewish Orthodox homes to keep pre-cooked food warm because Jewish law forbids cooking on the Jewish Sabbath and on certain festivals. Orthodox Jewish observance does not allow manually turning on and off electric appliances on certain days. Orthodox Jewish observance requires electric appliances to either be on a timer or left plugged in and operating for a minimum of 26 hours straight every week on the Jewish Sabbath. It is a practice to pre-cook food and use a food warming plate to be able to serve warm dishes on these special days.

Therefore, it is desirable to have a hotplate designed to be safely used in homes and operated safely for days at a time every week for years of use. However, there are limited devices in the market today that can safely heat food and safely operate for a minimum of 26 hours straight every week.

Hotplates on the market that are sold typically suffer from thermal degradation and failure when they are used repetitively, continuously, for long periods of time for years. The kind most commonly sold has a live electric wire coil for a heating element surrounded by easily breakable ceramic insulators. This type of heating element arrangement saves on manufacturing costs but has common insulator breakage and electrical shorts to the casing. For example, a frayed and/or damaged cord with an exposed live wire is extremely hazardous and can lead to electrocution or electric fires.

Further, because hotplates on the market are not typically designed to be operated safely for a minimum of 26 hours straight, the bottom of current hotplates will eventually transfer heat to and melt/damage whatever surface the hotplate rests upon if the hotplate is run for a minimum of 26 hours straight.

Further, Jewish Kosher laws require different cooking appliances/utensils for different types of food that must be separated. This can be a problem with typical hotplates as the area that touches the food is not separable from the electronics, and hotplates cannot reach and maintain the temperature of the section of the hotplate that touches the food in order to Kosher the hotplate.

For example, under Jewish Kosher laws, if one were to want to switch from using their oven to cook dairy to using their oven to cook meat, then the oven would need to be koshered by using a self-cleaning function. If the oven does not have a self-cleaning function, but does have a continuous-clean function, one could then cook meat in the same oven if they use the continuous clean mechanism (around 450°) for several hours and then turn the oven to its highest setting, for example 550°, for forty minutes. With older ovens without self-cleaning or continuous-clean functions, a blowtorch may be used to reach the required temperature to kosher the oven.

Thus, under Jewish Kosher law one would typically need a separate hotplate for heating dairy and a separate hotplate for heating meat because hotplates do not have self-cleaning functions or continuous clean functions, and it is not safe to expose the hotplate to blow torch.

Further, according to Jewish law, an electrical circuit may not be closed or opened by any action done by user on Sabbath. Some hotplates have only an on and off setting; however, some hotplates have thermo fuses which can cause the circuit for the heating element of the hotplate to open or close based on changes in temperature on the heating surface. Hotplates without a thermo fuse do not allow for automatic manipulation of the temperature of the heating surface. However, hotplates with a thermo fuse can cause a user to cause the heating element's circuit to close by placing cold food on the heating surface.

Therefore, it is desirable to provide an apparatus for safely warming food which addresses the above-identified problems and provides a way for a person to safely heat up food during a period of at least 26 hours every week without needing to turn on or off any electric appliances.

SUMMARY OF THE INVENTION

According to embodiments of the present invention, there is provided an apparatus and method for safely warming food.

According to embodiments of the present invention, the apparatus can include a housing having a metal frame, a metal base, and a fixed top plate. The fixed top plate may be configured to safely warm food. The frame may have a single wall or two or more connected walls which enclose a space within the frame. The frame can be connected to a bottom side of the base. The frame and fixed top plate may be made of brushed stainless steel. The base may be made of galvanized steel.

The apparatus can include a removable top plate configured to be connected and removed from a top side of the fixed top plate via clips, magnets, or sliding tracks, and may be configured to safely warm food. The removable top plate may be made of brushed stainless steel.

The apparatus may have a heating element connected to the base such that there is air between the heating element and the fixed top plate, the heating element does not directly touch the fixed top plate; and the heating element must heat the air between the heating element and the fixed top plate before heating the fixed top plate.

The heating element may include a stainless steel wire heating coil surrounded by a ceramic sheath. The ceramic sheath may in turn be surrounded by a stainless steel alloy sheath. The ceramic sheath may be made out of magnesium oxide.

Each wall of the base may have sets of air vents for ventilating the apparatus. The removable top plate may have a set of clips configured to connect and remove the removable top plate from the top side of the fixed top plate. The set of clips may be configured to be connected and removed from the sets of air vents.

The apparatus may have a resetting thermal fuse connected to one of the walls of the frame via a fuse holder. The fuse holder may be made of a heat insulating material such that the resetting thermal fuse may not be affected by a change in temperature of the housing, and the resetting thermal fuse may be affected by a change in temperature in the air between the heating element and the fixed top plate.

The apparatus may have a settable timer configured to turn the heating element on and off. The settable timer may be a non-digital dial timer that can be set by manually placing pins in a dial of the timer.

The apparatus may have a heat resistant insulation between the heating element and the base.

The apparatus may have removable legs attached to a bottom side of the base. The removable legs may be made from a heat insulating material such as plastic.

The apparatus may have a power cord connected to a circuit breaker. The circuit breaker may be configured to cut electricity to the apparatus if a temperature of the apparatus is above a predetermined temperature, or if a rate of change of the temperature of the apparatus is above a predetermined rate of change. The power cord may have a three pin prong.

The apparatus may have an aluminum handle. The aluminum handle may be removable and attachable to the apparatus.

According to embodiments of the present invention, the method can include warming food on a fixed top plate. The fixed top plate may be separated from a heating element of the heating apparatus by air such that the heating element does not directly touch the fixed top plate, and the heating element must heat the air between the heating element and the fixed top plate before heating the fixed hot plate.

In some embodiments of the invention, the method can include warming food on a removable top plate configured to be connected and removed from a top side of a frame of a heating apparatus via clips, magnets, or sliding tracks.

The heating element may automatically turn off or on depending on a temperature of a resetting thermal fuse. The resetting thermal fuse may be connected to the frame via a fuse holder made of heat insulating material such that the resetting thermal fuse is not affected is not affected by a change in temperature of the housing, and the resetting thermal fuse is affected by a change in temperature in the air between the heating element and the fixed top plate.

The heating element may be automatically turned on or off based on a settable timer.

Electricity to the apparatus may be automatically cut via a circuit breaker if a temperature of the apparatus is above a predetermined temperature, or a rate of change of the temperature of the apparatus is above a predetermined rate of change.

A different removable top plate may be used for different types of food.

The removable top plate may be koshered separately from the rest of the heating apparatus.

Embodiments of the present invention allow the apparatus for safely warming food to be operated repeatedly every week for long periods of time with a higher level of safety than what is currently available on the market. Embodiments of the present invention can be made with quality, durability, long service life and safety in mind.

BRIEF DESCRIPTION OF THE DRAWINGS

The foregoing and other objects, features, and advantages of the present invention, as well as the invention itself, is more fully understood from the following description of various embodiments, when read together with the accompanying drawings.

FIGS. 1B-C are views of the apparatus for safely warming food, according to one embodiment of the invention.

FIG. 5 is a bottom view of a removable top plate for an apparatus for safely warming food, according to one embodiment of the invention.

FIGS. 6A-C are various views of a clip for attaching a removable top plate to an apparatus for safely warming food, according to one embodiment of the invention.

Figure 1A:
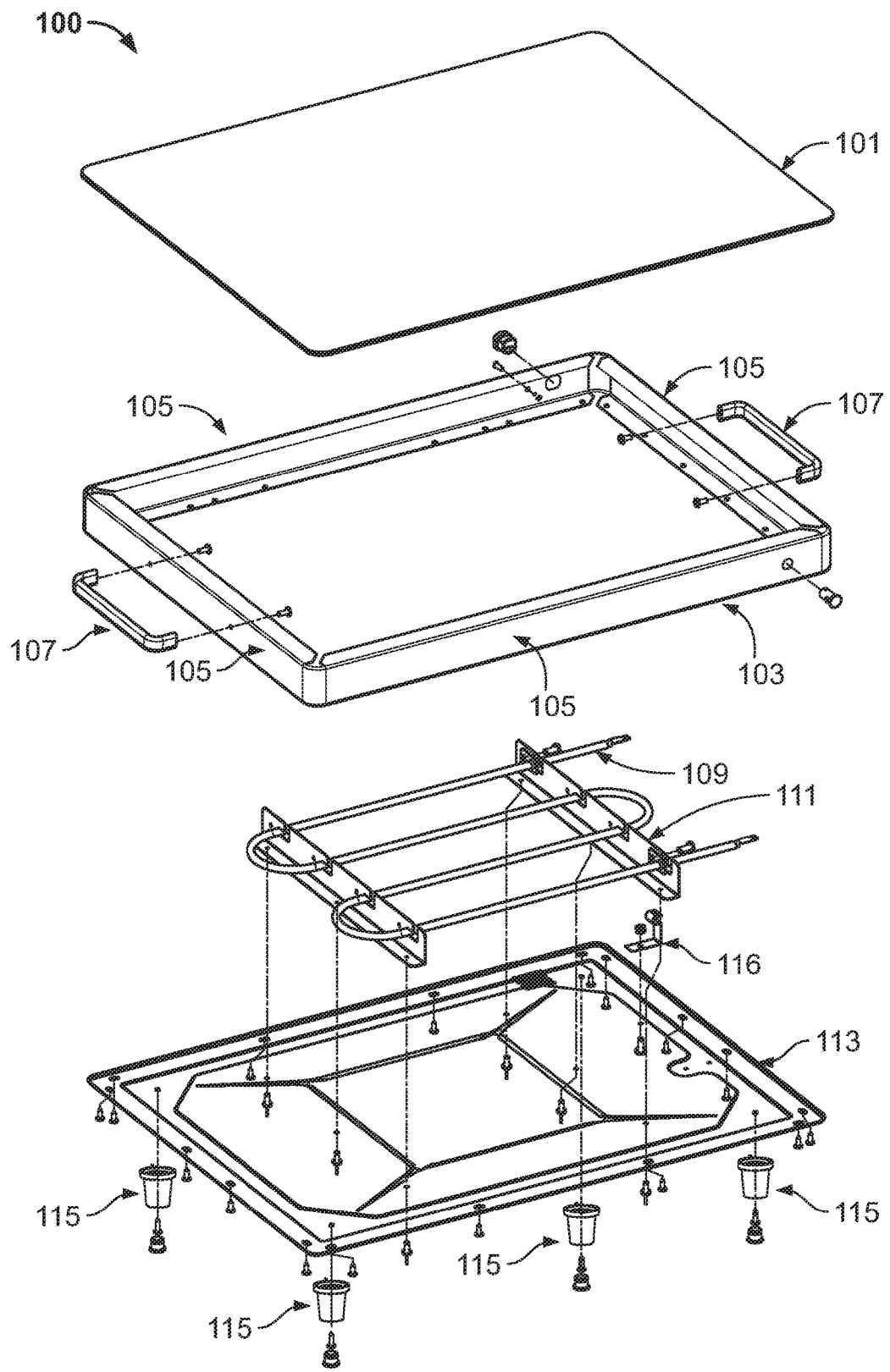
FIG. 1A is an exploded view of an apparatus for safely warming food, according to one embodiment of the invention.

It will be appreciated that, for simplicity and clarity of illustration, elements shown in the figures have not necessarily been drawn to scale. For example, the dimensions of some of the elements may be exaggerated relative to other elements for clarity. Additionally, the many features of any one embodiment shown in a figure should not be considered independent and separate from the features of an embodiment shown in another figure, and it is conceivable that features of any one embodiment may be combinable with another. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that embodiments of the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Figure 1B:
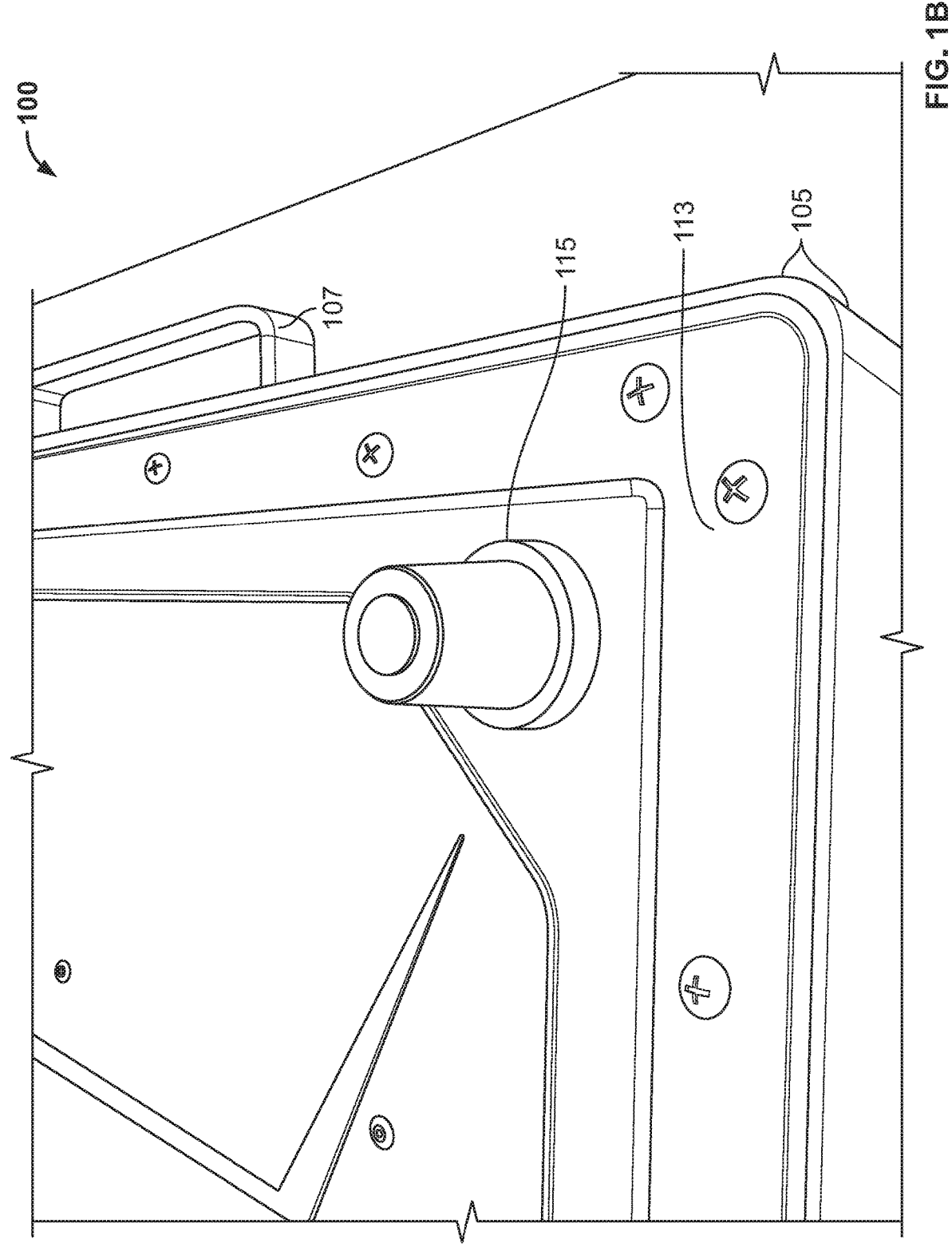
Figure 1D:
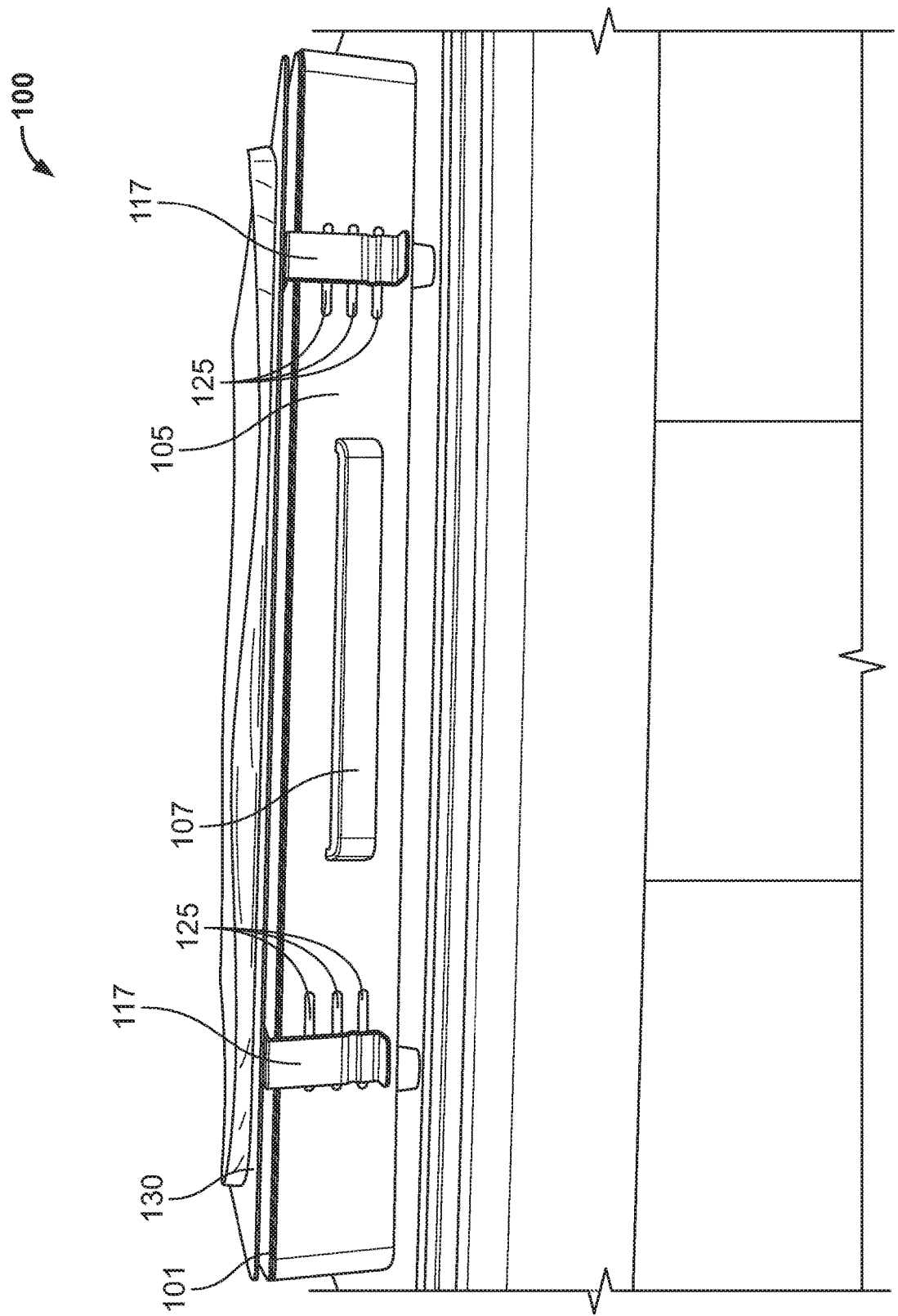
FIG. 1D is a side view of the apparatus for safely warming food, according to one embodiment of the invention.

Reference is made to FIG. 1A, which is an exploded view of an apparatus 100 for safely warming food, according to one embodiment of the invention. Reference is made to FIGS. 1B-C which are views of the apparatus 100 for safely warming food, according to one embodiment of the invention. Reference is made to FIG. 1D which is a side view of the apparatus 100 for safely warming food, according to one embodiment of the invention.

As shown in FIGS. 1A-D, the apparatus 100 may have a fixed top plate 101, a frame 103, a heating element 109, a base 113, and a plurality of legs 115.

The fixed top plate 101 and/or frame 103 may be made of stainless steel. Stainless steel is the only metal which is easily koshered with high heat or hot water. The fixed top plate 101 and/or frame 103 may have a brushed finish. In some embodiments of the invention, the fixed top plate 101 is made from glass. The fixed top plate 101 may be one millimeter thick. The fixed top plate 101 may be connected to the frame 103 with a layer of non-conductive high temperature glue. An extension of ground wire from the frame 103 may be welded to the fixed top plate 101.

The base 113 may be made of galvanized steel. The base 113 may be 0.40 mm thick. The frame 103 may have four connected frame walls 105 which encloses a space within the frame. In some embodiments of the invention, the frame includes a single wall which encloses the space within the frame. In some embodiments of the invention, the frame includes two or more connected walls which enclose the space within the frame.

The frame walls may be made of stainless steel. The frame walls may have a brushed finish. A handle 107 may be connected to a frame wall 105. The handle 107 may be made from aluminum. The handle 107 may have a plastic/rubber grip to prevent the handle 107 from heating up and burning a user. The handle may be removable to allow for the apparatus to be easily koshered.

A removable top plate 130 may be connected on top of the fixed top plate 101 to the four frame walls 105 of the frame 103 via four side clips 117. The clips 117 may use spring style tension to adhere to the apparatus 100. The clips 117 fit snugly by a curvature that snaps into air vents 125 on the frame walls 105. The frame walls 105 may have four sets of three air vents 125 in a vertical order, and two rows of air vents 12 on each of the frame walls 105. The air vents 105 may serve to ventilate the apparatus 100 and also work with the clips 117 of the removable top plate 101 to allow the removable top plate 101 from being snapped on and snapped off the frame walls 105.

No other warming plate or hotplate on the market has this removable top plate 101, and it was completely fabricated from scratch. In some embodiments of the invention, the removable top plate 101 is attached to the apparatus 100 via magnets, or sliding tracks.

Jewish Kosher laws require different cooking appliances for different types of food that must be separated. For example, Kosher law requires the owner to have different surfaces for different types of kosher food, example: meat, dairy and non-meat/dairy (referred to as "pareve" or neutral). This usually requires the customer to purchase and own separate appliances for the different types of food. Further, if a cooking utensil comes in contact with non-kosher food, Orthodox Jewish practice requires heating it past the temperature of its normal use in order to render it again fit for use with kosher food.

The removable top plate 101 allows a user to remove the top plate 101 from the apparatus 100, and use a different top plate depending on the type of food being reheated. Further, the removable top plate 101 allows the top plate 101 to be easily koshered after use with non-kosher food. Thus, it is advantages for the user can to have one electric hotplate with different top plates, rather than having separate electrical appliances for the different kosher food types. Further, removable top plate 101 also allows for the user to clean the plate 101 separately from the apparatus 100, such as by completely submerging it in water.

In a preferred embodiment of the invention, the heating element 109 may be an insulated stainless steel tubular heating element for low wattage consumption and durability. The heating element 109 may have a stainless steel wire coil inner element surrounded by a ceramic sheath, and the ceramic sheath in turn is surrounded by a stainless steel alloy sheath. The wire coil inner element may be surrounded by magnesium oxide (MgO).

Surrounding the wire coil inner element by magnesium oxide reduces the risk of shortage, breakage, thermal break down and adds a longer service life to the apparatus 100. Embodiments of the present invention have incorporated into the design several safety features that allow it to be operated for long periods of time 26 to 75 hours, repeatedly, safely for years of dependable use.

The heating element 109 may be connected to a heating element holder 111. The heating element holder 111 may be connected to the base 113 via at least one L bracket 116. The base 113 may be connected to the four frame walls 105 of the frame 103. The apparatus 100 may have air in between the heating element 109 and the fixed top plate 101 such that the heating element 109 does not directly touch the removable top plate 101, and the heating element must heat the air between the heating element 109 and the fixed top plate 101 before the air may heat the fixed top plate 101. Forcing the heating element 109 to heat the fixed top plate through convection as opposed to direct heat not only helps prevent food from being burnt or over cooked, but also makes the apparatus 100 more Kosher for use on the Sabbath. For example, under Kosher law, it is better to reheat food on the Sabbath by indirectly heating the food as opposed to directly heating the food by the heating element 109. Further, it is more Kosher to prevent the apparatus from being used to cook food from start to finish on the Sabbath.

The plurality of legs 115 may be connected to the base 113. The plurality of legs 115 may be manufactured to lift the heat from the surface of the countertop. For example, the apparatus 100 may be raised from the counter with legs 115 that keep the unit from heating and damaging the countertop that it is setting on. The apparatus 100 may have at least four legs 115 in a square/rectangular orientation for stability. In a preferred embodiment, the apparatus 100 may have six legs 115. The legs 115 may be made from plastic so that heat is not easily transferred through the legs 115 to the surface of the countertop. The legs may be removable to make it easier to kosher the apparatus 100.

In some embodiments of the invention, there may also be heat resistant insulation under the heating element 109, stopping the flow of heat from affecting the countertop that the unit is setting on. The unit could also have insulation between the heating element 109 and the base 113 to restrict most all heat transference to the countertop it is sitting on.

In some embodiments of the invention, the heating element 109 may have a resetting thermal fuse which prevents a circuit of the heating element 109 from being closed by placing cold food on the fixed top plate 101 or the removable top plate 130. The thermal fuse may be placed in a special thermal fuse holder so that the thermal fuse is held away from the metal housing of the apparatus 100 so that the thermal fuse is only effected by internal air temperature of the air between the fixed top plate 101 and the heating element 109. Thus, placing cold food on the fixed top plate 101 or the removable top plate 130 would not close the circuit because placing cold food on the top plate 101 or removable top plate 130 would not change the internal air temperature enough to cause a change in the fuse's conductivity. For example, the resetting thermal fuse may be connected to one of the walls 105 of the frame 103 via a fuse holder, and the fuse holder may be made from a heat insulating material such that the resetting thermal fuse is not affected by a change in temperature of the housing 103, and the resetting thermal fuse is affected by a change in temperature in the air between the heating element 109 and the fixed top plate 101.

In some embodiments of the invention, the apparatus 100 may have a settable timer that can turn the heating element 109 on and off without the user having to manually turn the heating element 109 on and off. The timer can be a non-digital dial timer that can be easily set by manually placing pins in the dial. The timer may also have a lid that fastens shut during the Jewish Sabbath so that the timing could not be accidentally changed on the Sabbath (a prohibited action).

Also, since it is common practice to leave the hotplate on overnight, for sometimes days at a time, embodiments of the hotplate may incorporate a timer, which can automatically turn the unit on and off at pre-selected intervals.

Figure 2A:
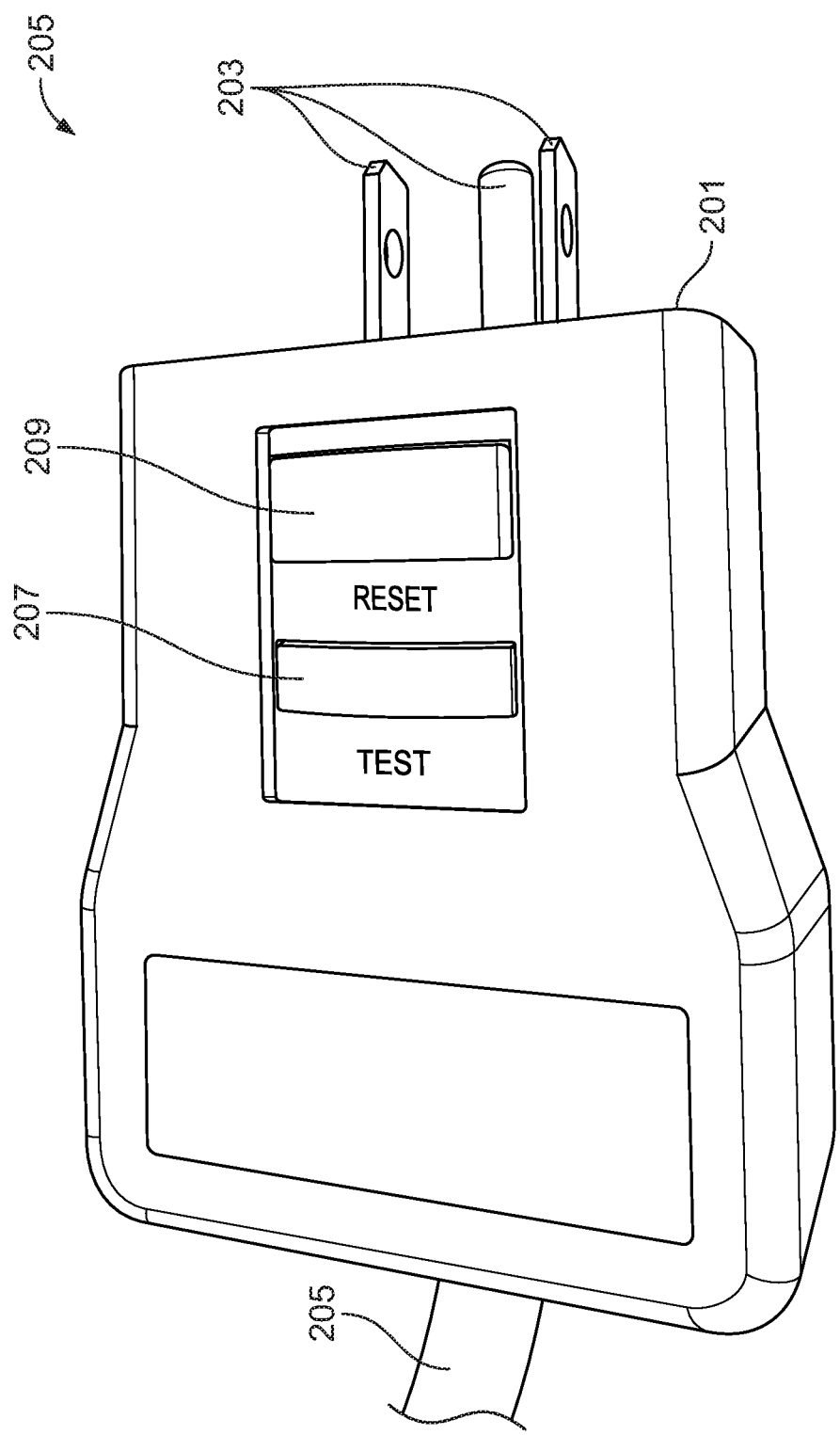
FIGS. 2A-B are a top view and a bottom view, respectively, of a circuit breaker for an apparatus for safely warming food, according to one embodiment of the invention.
Figure 2B:
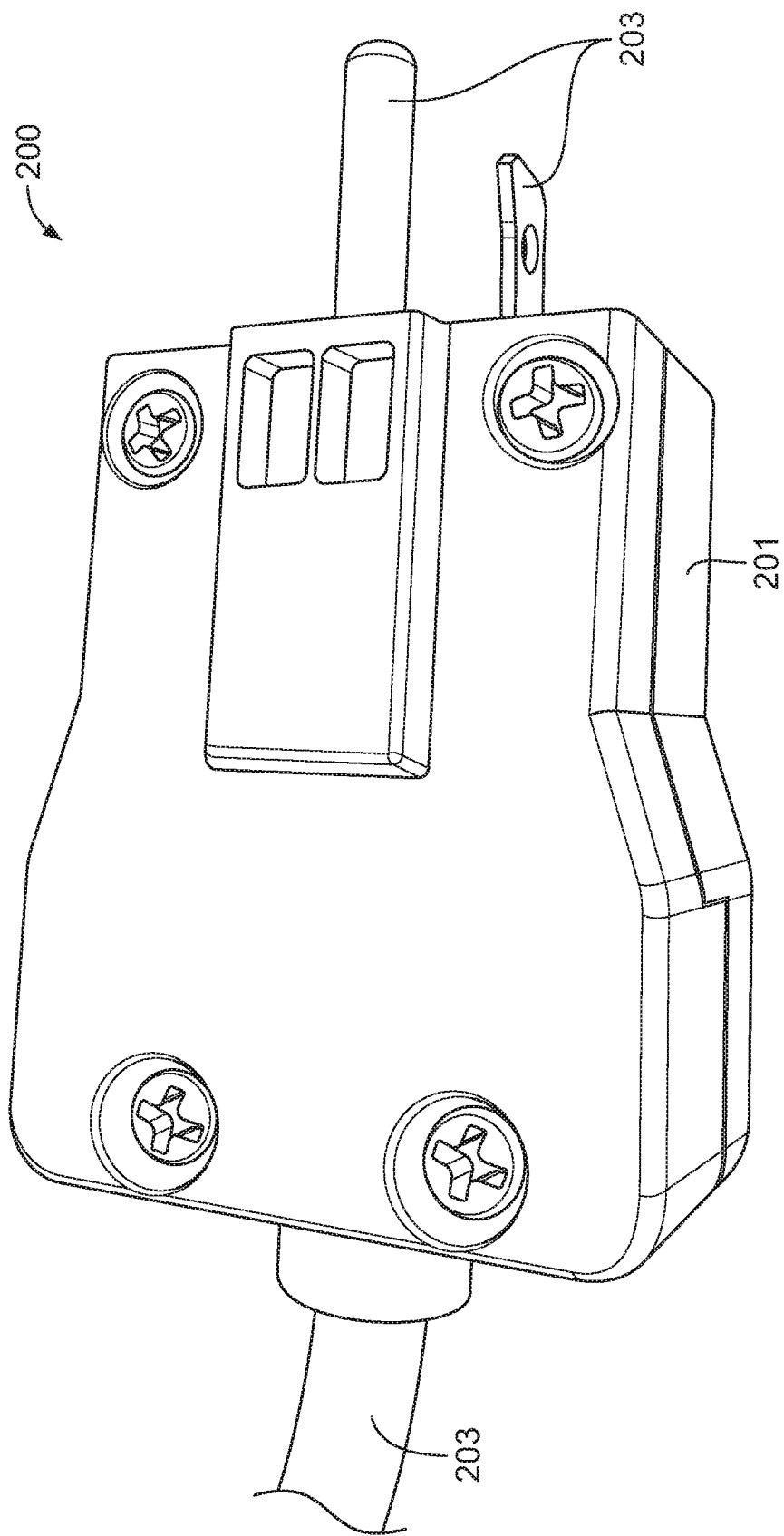

Reference is made to FIGS. 2A-B, which are a top view and a bottom view, respectively, of a circuit breaker 200 for a hotplate (e.g., the apparatus 100, as shown above in FIGS. 1A-D) according to one embodiment of the invention. As shown in FIG. 2A, the circuit breaker 200 may have a housing 201, a test switch 207, and a reset switch 209. The housing 201 may include a three pin prong 203 with a ground for connecting the hotplate to a wall outlet, a power cord 205 which may be connected to an apparatus for safely warming food. The circuit breaker 200 may be an amperage circuit breaker for avoiding possible electric accidents. The cord 205 may be a heavy duty three conductor high heat resistant fluoropolymer insulated wire. The cord 205 may be rated to handle continuous temperatures of 1,000° F.

The cord 205 may be a 300 Volt high current rated heavy duty PVC insulated power cord that resists thermal breakdown common to cheaper lower amperage rated copper wiring. No other commercial hotplates use this type heavy duty of electric cable because it is designed for industrial use. The insulation of the heavy duty cord protects the cord from common kitchen accidents involving fire and sharp cutting utensils.

The circuit breaker 200 may be an automatically resetting circuit breaker that cuts the electricity if the internal temperature change is above a predetermined rate of change or if the temperature rises above a predetermined temperature. The thermal circuit breaker fuse also automatically returns to normal operation once the temperature returns to normal. As mentioned earlier, the thermal fuse is held internally suspended in midair by a fuse holder to avoid any change in housing temperature affecting the circuitry of the fuse.

The circuit breaker 200 may be a heavy duty water proof amperage circuit breaker that is installed at a plug 203 that will cut the flow of electricity if the amperage flow rises to an unsafe level. The amperage circuit breaker requires the user to push a button to reset the device.

In some embodiments of the invention, the hotplate has a wire tube to organize the electric cord 205 away from the hotplate protecting it at the same time. The cord 205 and circuit breaker 200 may have three conductors with ground. Other configurations would be to have the circuit breaker 200 in the middle of the cord 205, halfway from the outlet to the hotplate.

Figure 3B:
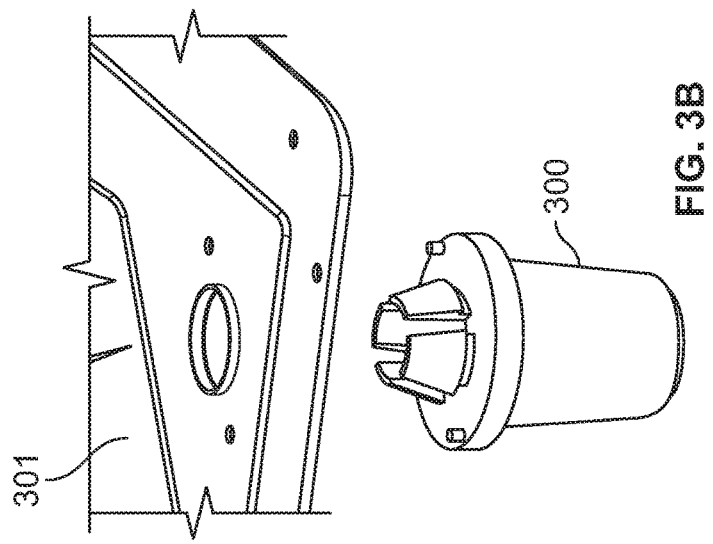
FIGS. 3A-C are various views of a removable plastic leg for an apparatus for safely warming food, according to one embodiment of the invention.
Figure 3C:
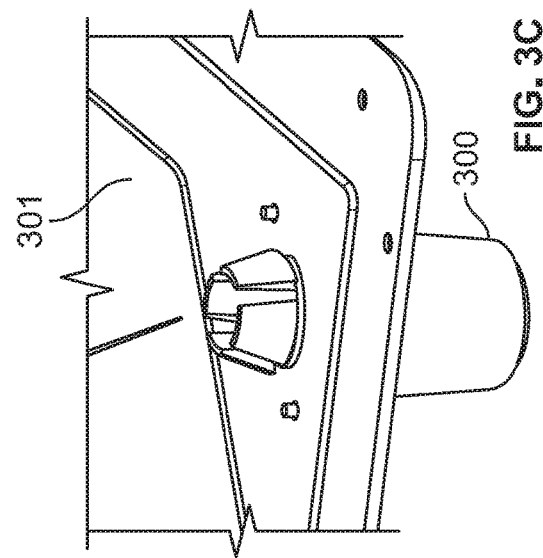
Figure 3A:
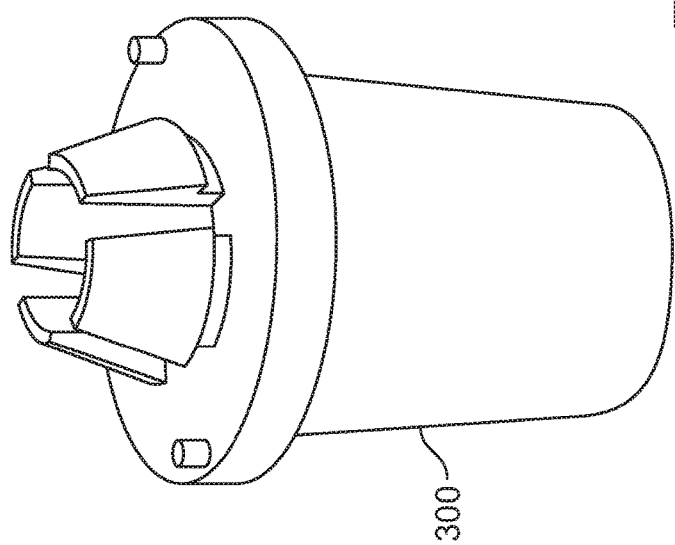

Reference is made to FIGS. 3A-C which are various views of a removable plastic leg 300 (e.g., the leg 115, as shown above in FIGS. 1A-D) for a hotplate (e.g., the apparatus 100, as shown above in FIGS. 1A-D), according to one embodiment of the invention. The removable plastic leg 300 may be attached to a base 301 (e.g., the base 113, as shown above in FIGS. 1A-D) of the apparatus for safely warming food.

The removable plastic legs 300 may be able to snap in and out of the base 301 of the hotplate without and tools or screws. This allows the hotplate to be boxed in a smaller gift box, legs 300 packaged unattached. It also allows the legs 300 to be replaced easily if broken, since they are the only plastic part on the hotplate. None of the internal circuitry or other parts is easily breakable. The hotplate can be dropped from three feet onto a hard surface without causing external damage or internal breakage. Further, if the hotplate is used with non-kosher food, the removable legs 300 allows the end user to easily heat the housing with an external flame past the temperature of normal use, making the unit kosher again.

Figure 4:
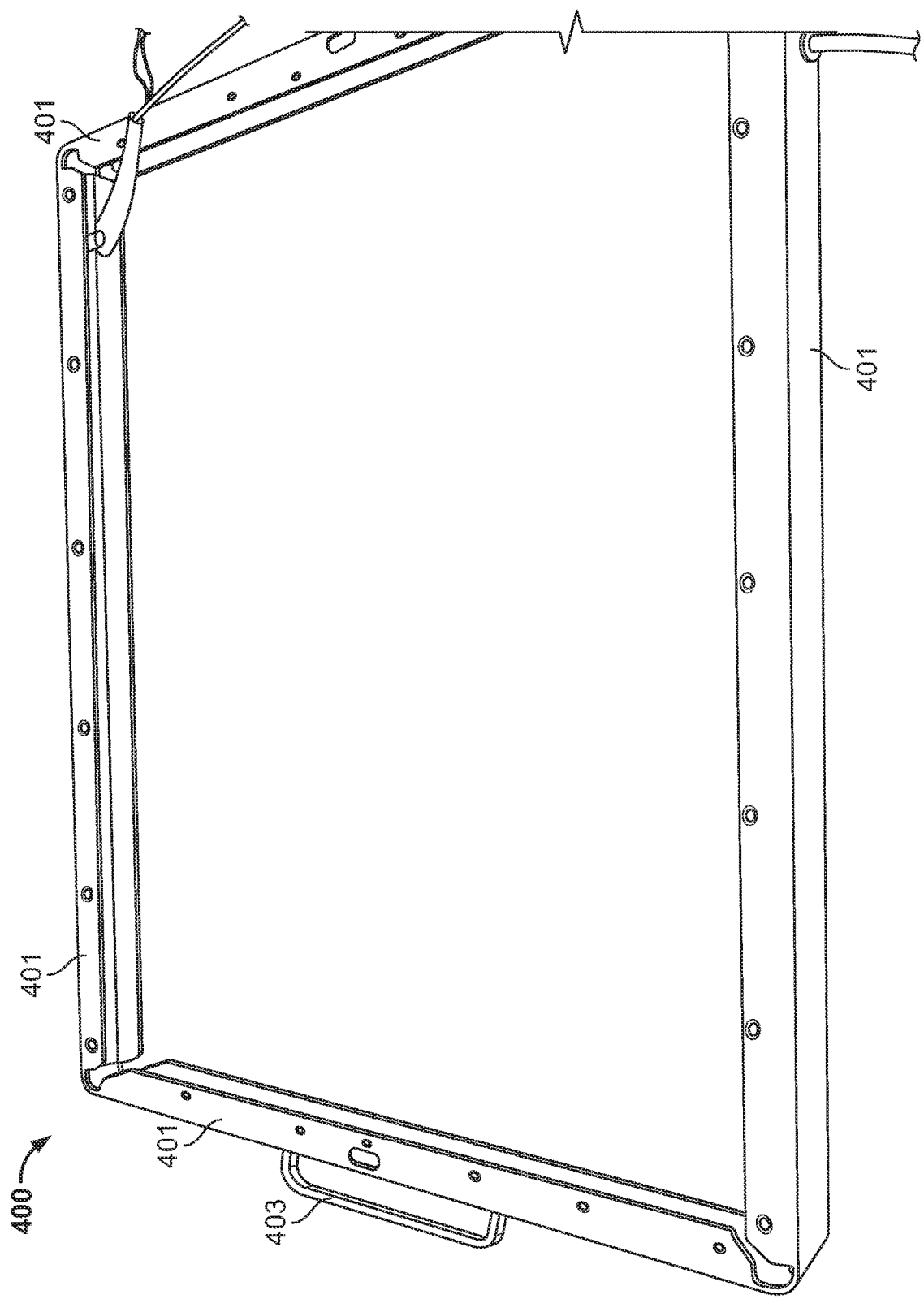
FIG. 4 is a top view a base for an apparatus for safely warming food, according to one embodiment of the invention.

Reference is made to FIG. 4 which is a top view a base 400 (e.g., the base 113, as shown above in FIGS. 1A-D) for an apparatus (e.g., the apparatus 100, as shown above in FIGS. 1A-D) for safely warming food, according to one embodiment of the invention. The base 400 may have four frame walls 401 (e.g., the frame walls 105, as shown above in FIGS. 1A-D). The base 400 may have a handle 403 (e.g., the handle 107, as shown above in FIGS. 1A-D) which may be attached to a frame wall 401.

Reference is made to FIG. 5 is a bottom view of a removable top plate 500 (e.g., the removable top plate 130, as shown above in FIGS. 1A-D) for an apparatus for safely warming food (e.g., the apparatus 100, as shown above in FIGS. 1A-D), according to one embodiment of the invention. The removable top plate 500 may have clips 501 (e.g., the clips 117, as shown above in FIG. 1D) which may be used to attach and remove the removable top plate 500 from the apparatus for safely warming food.

Figure 6A:
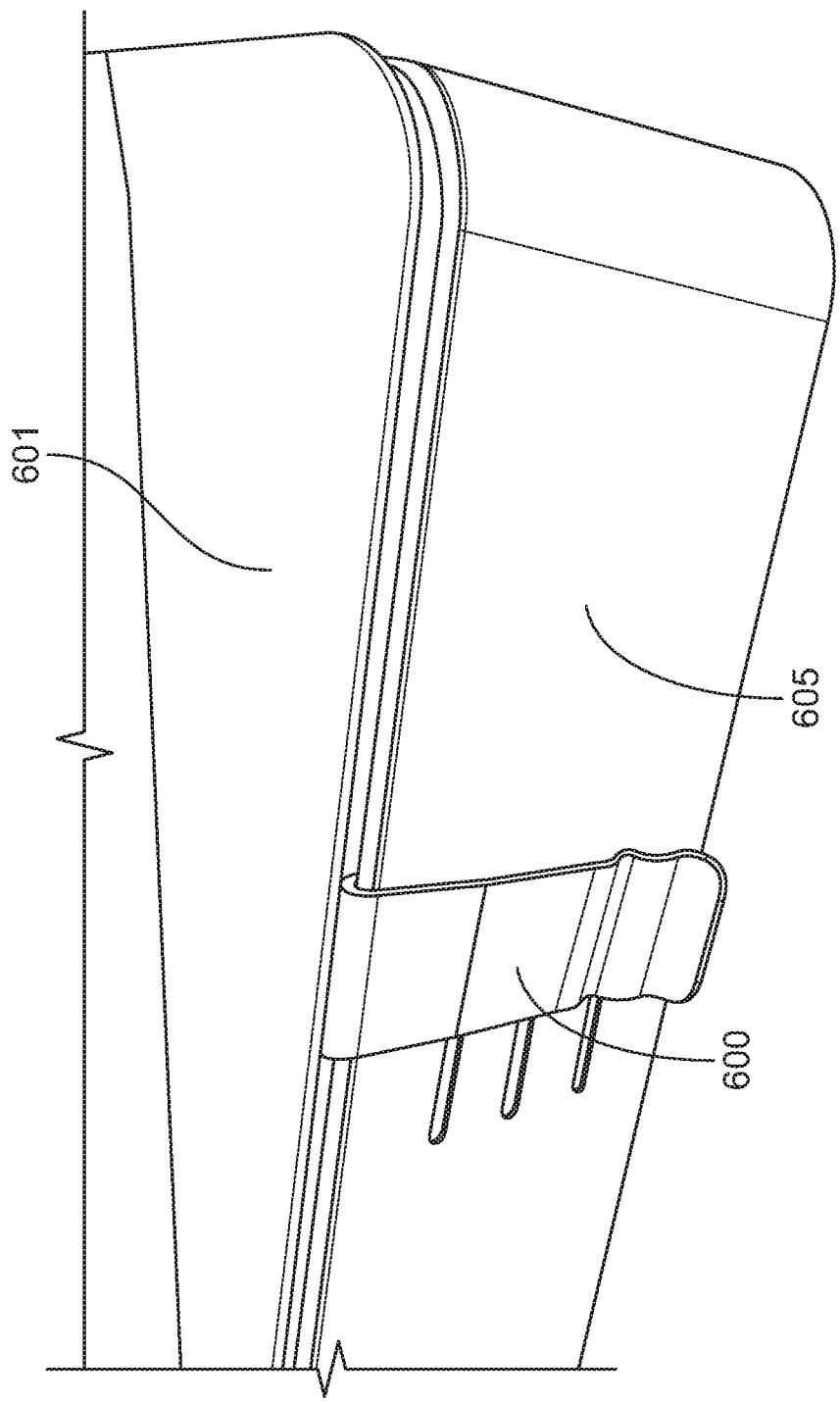
Figure 6C:
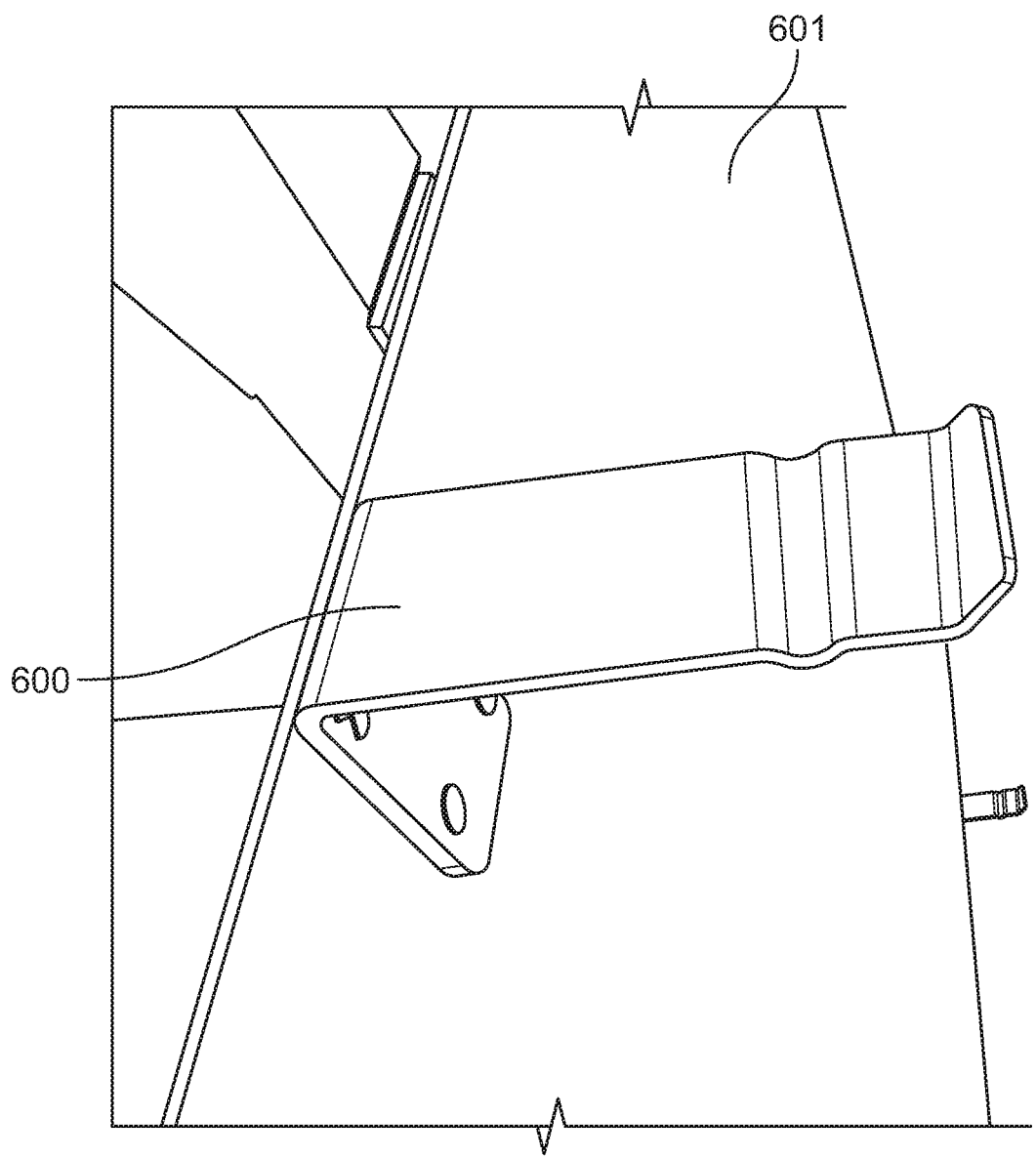

Reference is made to FIGS. 6A-C which are various views of a clip 600 (e.g., the clips 117, as shown above in FIG. 1D) for attaching a removable top plate 601 (e.g., the removable top plate 130, as shown above in FIGS. 1A-D) to an apparatus 603 (e.g., the apparatus 100, as shown above in FIGS. 1A-D) for safely warming food, according to one embodiment of the invention.

Figure 7:
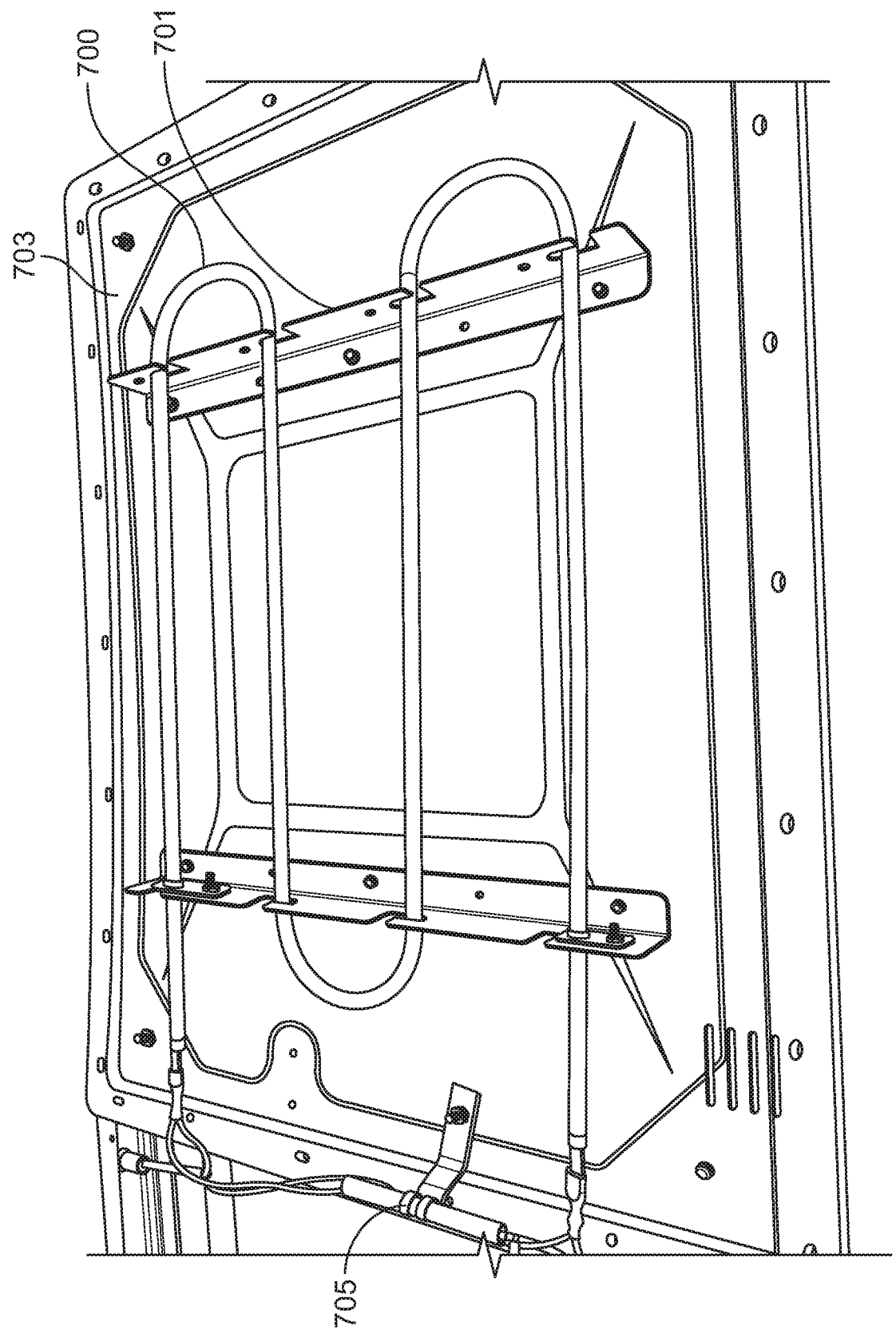
FIG. 7 is a top view of a heating element for an apparatus for safely warming food, according to one embodiment of the invention.

Reference is made to FIG. 7 which is a top view of a heating element 700 (e.g., the heating element 109, as shown above in FIG. 1A) for an apparatus for safely warming food (e.g., the apparatus 100, as shown above in FIGS. 1A-D), according to one embodiment of the invention. The heating element 700 may be attached to a heating element holder 701 (e.g., the heating element holder 111, as shown above in FIG. 1A). The heating element holder 111 maybe attached to a base 703 (e.g., the base 113, as shown above in FIGS. 1A-D). The heating element 700 may have a thermal fuse 705.

A problem solved by embodiments of the present invention is that the most common hotplates used today consume more wattage than embodiments of the present invention to maintain the required heat to keep food at a safe temperature that kills all bacteria and is suitable for serving and not drying out or burning the food. Jewish users use their hotplate to warm cold food on Sabbath to serving temperatures, so the unit must be hot enough to warm cold food quickly but not cook it. Embodiments of the present invention restricts the amperage flow by a combination of the internal resistance of the heating element metal alloy, and the thermal fuse and circuit breaker. This is not common since most hotplates use inexpensive thin wire heating elements that require more amperage to reach the needed temperatures. Thus, using the heavy duty, long service life, more expensive stainless steel for the heating element that has always only been used externally in ovens and stovetops, internally allows for smaller amperages attaining higher internal temperatures. Most hotplates use inferior heating elements that require 4 or more watts to achieve the same temperature as embodiments of the present invention. The internal thermal circuitry of embodiments of the present invention (stainless steel tubular heating element surrounded by (magnesium oxide, MgO) and that is surrounded by another steel alloy sheath) operates on 2 Watts of electricity to keep the temperature in a range of 240 degrees to 280 degrees Fahrenheit.

Embodiments of the present invention, allows for longer service life of a hot plate with constant long term repeated use, has added electrical safety features, has no breakable parts, avoids accidental drop and common kitchen damage, and fits kosher customer needs with accessories and housing that have never been addressed before in another similar unit.

It will be evident to those skilled in the art that the invention is not limited to the details of the foregoing illustrative embodiments and that the present invention may be embodied in other specific forms without departing from the spirit or essential attributes thereof.

The embodiments presented herein are, therefore, to be considered in all respects as illustrative and not restrictive of the scope of the invention, and the skilled artisan will appreciate the appropriate equivalents thereto, which are to be considered as part of this invention.

The invention claimed is:

1. An apparatus for safely warming food comprising:
   a housing having a metal frame, a metal base, and a fixed top plate, wherein:
      the frame includes a single wall or two or more connected walls which enclose a space within the frame,
      the frame is connected to a bottom side of the base, and
      the fixed top plate is configured to safely warm food;
   a heating element connected to the base such that:
      there is air between the heating element and the fixed top plate,
      the heating element does not directly touch the fixed top plate; and
      the heating element must heat the air between the heating element and the fixed top plate before heating the fixed hot plate;
   a resetting thermal fuse connected to one of the walls of the frame via a fuse holder, the fuse holder made of a heat insulating material such that:
      the resetting thermal fuse is not affected by a change in temperature of the housing, and
      the resetting thermal fuse is affected by a change in temperature in the air between the heating element and the fixed top plate;
   a settable timer configured to turn the heating element on and off; and
   a removable top plate having a set of clips configured to connect and remove the removable top plate from the top side of the base, wherein:
      the removable top plate is configured to safely warm food;
      each wall of the base has sets of air vents for ventilating the apparatus; and
      the set of clips are configured to be connected and removed from the sets of air vents.

2. The apparatus of claim 1, wherein:
   the frame and fixed top plate are made of brushed stainless steel; and
   the base is made of galvanized steel.

3. The apparatus of claim 1, wherein:
   the heating element comprises a stainless steel wire heating coil surrounded by a ceramic sheath; and
   the ceramic sheath is surrounded by a stainless steel alloy sheath.

4. The apparatus of claim 3, wherein the ceramic sheath is made out of magnesium oxide.

5. The apparatus of claim 1, further comprising a heat resistant insulation between the heating element and the base.

6. The apparatus of claim 1, wherein the timer is a non-digital dial timer that can be set by manually placing pins in a dial of the timer.

7. The apparatus of claim 1, further comprising removable legs attached to a bottom side of the base, the removable legs made from a heat insulating material.

8. The apparatus of claim 7, wherein the removable legs are made from plastic.

9. The apparatus of claim 1, further comprising a power cord connected to a circuit breaker, the circuit breaker configured to cut electricity to the apparatus if:
   a temperature of the apparatus is above a predetermined temperature; or
   a rate of change of the temperature of the apparatus is above a predetermined rate of change.

10. The apparatus of claim 9, wherein the power cord has a three pin prong.

11. An apparatus for safely warming food comprising:
    a housing having a brushed stainless steel frame, a galvanized steel base, a brushed stainless steel fixed top plate, and a stainless steel removable top plate, wherein:
       the fixed top plate is configured to safely warm food;
       the frame includes a single wall or two or more connected walls which enclose a space within the frame,
       the frame is connected to a bottom side of the base, and
       the removable top plate is configured to be connected and removed from a top side of the fixed top plate via clips, magnets, or sliding tracks, and configured to safely warm food;
    a heating element comprising a stainless steel wire heating coil surrounded by a magnesium oxide sheath, the magnesium oxide sheath surrounded by a stainless steel alloy sheath, the heating element connected to the base such that:
       there is air between the heating element and the fixed top plate,
       the heating element does not directly touch the fixed top plate; and
       the heating element must heat the air between the heating element and the fixed top plate before heating the removable hot plate;
    a heat resistant insulation between the heating element and the base;
    a resetting thermal fuse connected to one of the walls of the frame via a fuse holder, the fuse holder made of a heat insulating material such that:
       the resetting thermal fuse is not affected by a change in temperature of the housing, and
       the resetting thermal fuse is affected by a change in temperature in the air between the heating element and the fixed top plate;
    removable plastic legs attached to a bottom side of the base;
    a settable non-digital dial timer configured to turn the heating element on and off; and a power cord having a three pin prong, the power cord connected to a circuit breaker, the circuit breaker configured to cut electricity to the apparatus if:
- a temperature of the apparatus is above a predetermined temperature, or
- a rate of change of the temperature of the apparatus is above a predetermined rate of change.

12. The apparatus of claim 11, further comprising an aluminum handle.

13. The apparatus of claim 12, wherein:
- the aluminum handle is configured to be removed and attached to the frame of the apparatus; and
- the aluminum handle has a heat insulated grip.

* * * * *